United States Patent
Chainer et al.

Patent Number: 6,075,665
Date of Patent: *Jun. 13, 2000

[54] OPTIMIZATION OF MULTIMEDIA MAGNETIC DISK STORAGE DEVICES

[75] Inventors: Timothy Joseph Chainer, Mahopac; Ephraim Feig, Ossining, both of N.Y.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/667,342

[22] Filed: Jun. 20, 1996

Related U.S. Application Data

[63] Continuation-in-part of application No. 08/314,029, Sep. 28, 1994, abandoned.

[51] Int. Cl.[7] ............................... G11B 5/09; G11B 15/46
[52] U.S. Cl. ............................................ 360/48; 360/73.03
[58] Field of Search .................................... 360/48, 73.03, 360/46; 369/50, 54, 60; 386/125, 126, 45

[56] References Cited

U.S. PATENT DOCUMENTS

| | | |
|---|---|---|
| 4,357,635 | 11/1982 | Hasegawa . |
| 4,514,771 | 4/1985 | Stark et al. . |
| 4,724,495 | 2/1988 | Hedberg et al. ........................... 360/48 |
| 4,769,833 | 9/1988 | Farleigh et al. ........................ 379/105 |
| 4,780,866 | 10/1988 | Syracuse ......................... 360/73.03 X |
| 5,087,992 | 2/1992 | Dahandeh . |
| 5,350,303 | 9/1994 | Fox et al. ............................ 382/310 X |
| 5,369,533 | 11/1994 | Ottesen et al. . |
| 5,404,347 | 4/1995 | Jeong ........................................ 369/83 |
| 5,438,460 | 8/1995 | Coker et al. .............................. 360/46 |
| 5,442,390 | 8/1995 | Hooper et al. .............................. 348/7 |
| 5,627,533 | 5/1997 | Clark ......................................... 341/51 |
| 5,764,945 | 6/1998 | Ballard .................................... 395/440 |

*Primary Examiner*—Aristotelis M. Psitos
*Assistant Examiner*—Regina Y. Neal
*Attorney, Agent, or Firm*—Daniel P. Morris

[57] ABSTRACT

A magnetic disk drive and a method for designing the same wherein the recording density, capacity, data rate access time are determined as a function of the application requirement and data type stored on the disk.

24 Claims, 4 Drawing Sheets

OPTIMIZATION OF MULTIMEDIA MAGNETIC DISK STORAGE DEVICES

This is a continuation-in-part of application Ser. No. 08/314,029, filed Sep. 28, 1994, now abandoned.

FIELD OF THE INVENTION

The present invention relates to magnetic data storage devices.

BACKGROUND OF THE INVENTION

Disk drive storage has been on a continuing curve of increasing recording density. However, the system requirements to retrieve data at faster rates have driven storage devices to have increased data transfer rates and reduced data retrieval access times. This has resulted in disk drives having higher rotational speed (typically measured in rotations per minute, RPM) of the magnetic media and actuators having faster seek times. Presently, magnetic hard disk drives operate at a data rate and access time independent of the type of data stored on the media. All data is treated as random alphanumeric data. Therefore these systems balance data rate, access time and recording density. The recording density and the access time is not optimized to the type of data stored.

There are numerous techniques to increase the recording density of a media surface such as zone recording which optimizes the linear density of each zone by changing the recording frequency. Such a technique is shown in U.S. Pat. No. 5,087,992 wherein the frequency is set within each zone to the maximum error rates that does not exceed a selected value. Another technique is described in U.S. Pat. No. 4,514,771 where the rotational speed of the disk is varied as the recording transducer is translated across the disk surface to maximize the linear density on each track. Another technique is described in U.S. Pat. No. 4,357,635 where either the rotation speed of the disk or the recording frequency is varied to achieve the maximum linear density on all tracks. Another technique is to adjust the error rate to the type of data stored.

SUMMARY OF THE INVENTION

The above described techniques to increase the storage capacity on a disk drive do not address the further issue of optimizing the capacity of the file in accordance to the data rate requirements of the data stored on the media. For example, for random alphanumeric data, the data rate is typically set in accordance with the maximum frequency the detection channel can operate while meeting on-track error rate requirements.

Other data types such as images, video, speech and FAX can meet application requirements at much lower data rates. Therefore, in accordance with the present invention, the recording density and capacity of a magnetic storage device, the data rate and access time are determined as a function of the application requirements and data type stored on the disk.

DETAILED DESCRIPTION OF THE PREFERRED EMBODIMENT

Figure 1:
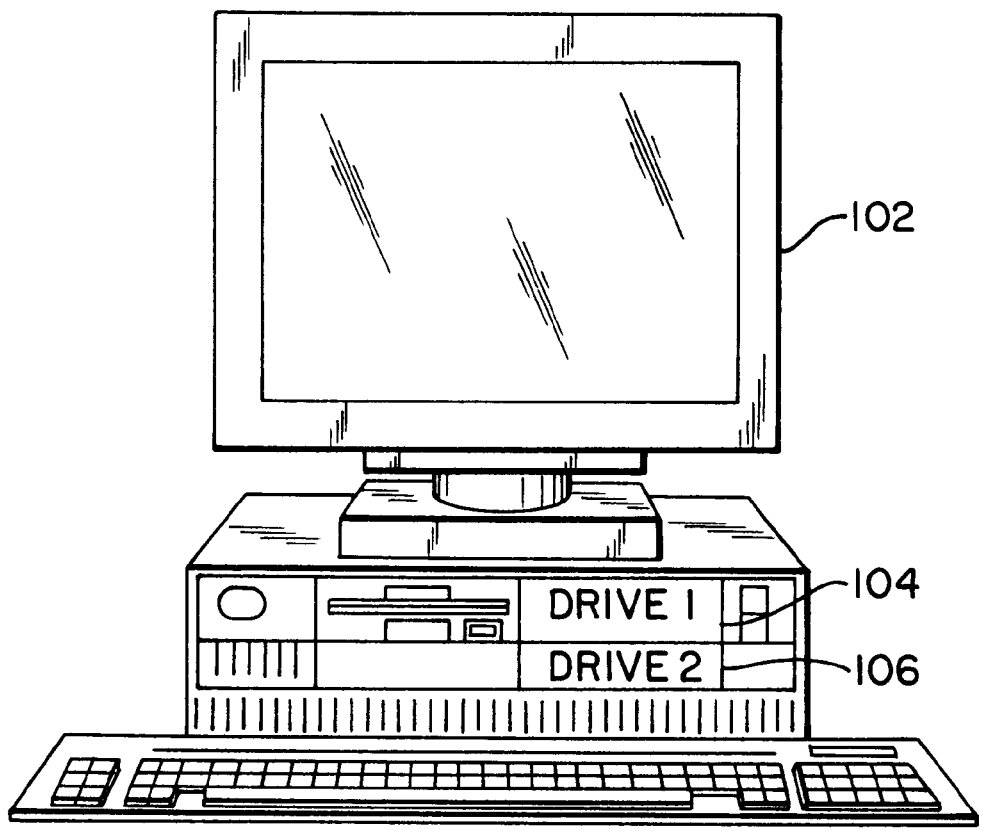
FIG. 1 shows a workstation with a first disk drive for storing random data and a second disk drive for storing compressed video data in accordance with an embodiment of the present invention.

Consider a disk drive as shown in FIG. 1 which optimizes the recording density for MPEG compressed video. FIG. 1 shows a workstation 102 with two storage devices 104, 106. The first storage device 104 is a magnetic hard disk drive which stores random data. The second storage device 106 is a magnetic DASD or more specifically, a magnetic hard disk drive, which has been optimized to store compressed video data (e.g. MPEG data blocks) at a significantly higher recording density than the first storage device.

In accordance with an embodiment of the present invention, the data rate required for the second storage device 106 is determined by the application requirement to provide continuous MPEG compressed video data (which for MPEG1 is approximately 1.5 Megabits/sec). In the case of discrete video segments which the user has selected and queued to view in a continuous data stream the requirement can be met with the combination of the magnetic hard disk drive 106 and an internal memory buffer (described later with respect to FIG. 2).

Figure 2:
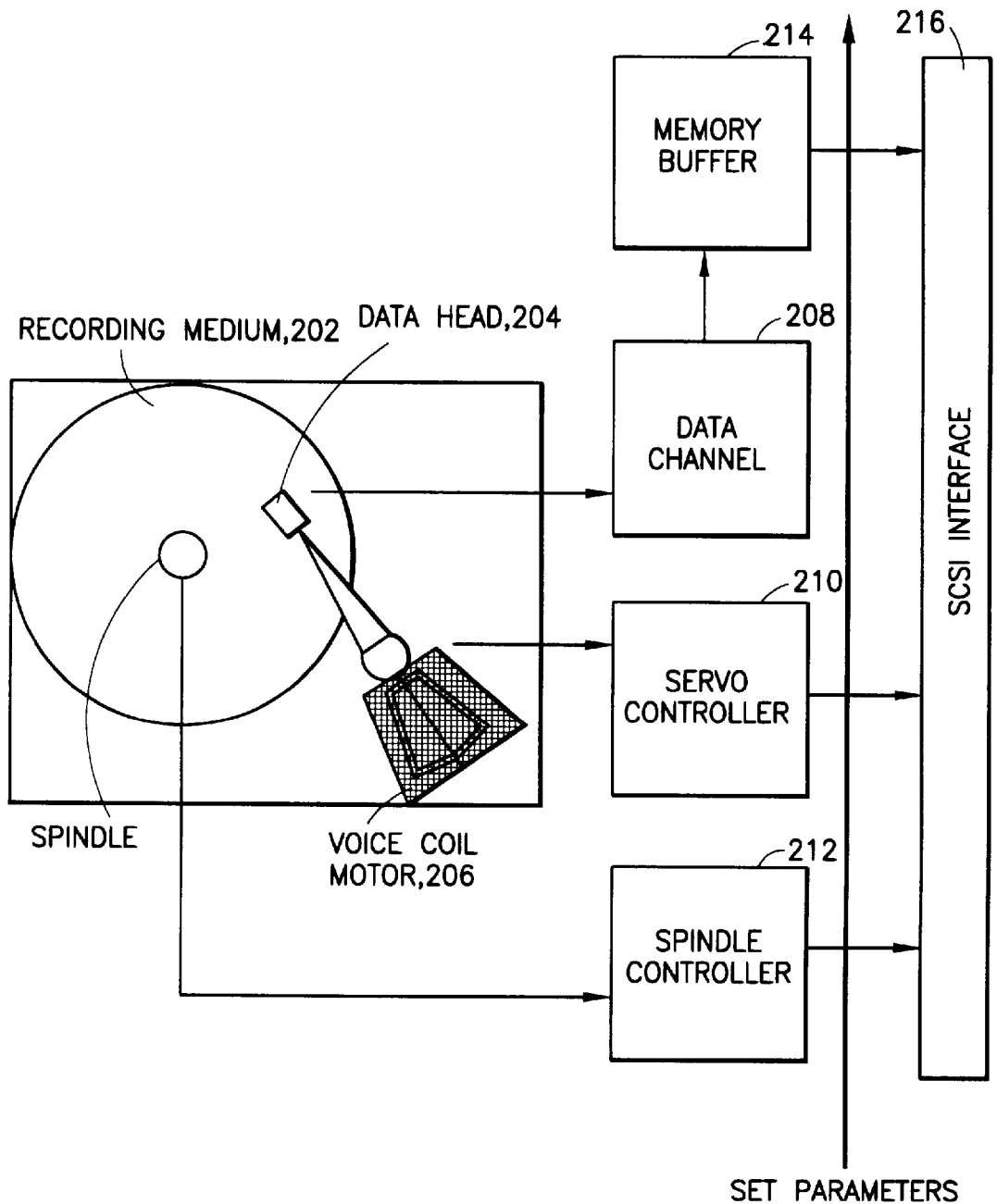
FIG. 2 shows a diagram of a multimedia disk drive in accordance with an embodiment of the present invention.

A more detailed block diagram of the second disk drive 106 is shown in FIG. 2. This disk drive of FIG. 2 (which is optimized for multimedia) includes a rotating storage media 202 and a recording transducer 204 mounted on a voice coil motor driven actuator 206. The electronic components include a data channel 208, an actuator servo controller 210, a spindle speed controller 212, a first-in/first out (FIFO) memory buffer 214 and a SCSI interface 216. The recording transducer 204 is actuated (moved) across the surface of the media 202 by means of the voice coil actuator 206.

The rotation speed of the media is set by the spindle speed controller 212. The seek time of the actuator 206 is set by the servo controller 210. The access time is the sum of the seek time plus the latency time (the period of revolution). The data is encoded or decoded onto the storage media with by way of the data channel 208 and upon readout, is buffered in the FIFO memory buffer 214. The disk drive is interfaced to the workstation 102 or a file server through the SCSI interface 216, which is a conventional industry standard.

In accordance with an embodiment of the present invention, the disk drive of FIG. 2 is optimized for multimedia data. The relationship of the disk drive data rate, memory buffer size and access time are described by the following relationships, wherein:

BUF is the size of the fifo memory buffer 214;
Bin is the video segment size, in bits, of the minimum video segment (MVST);
Bout is the number of bits output from the memory buffer 214 during retrieval of the minimum size video segment from the disk drive;
BTM is the maximum number of bits in the outer most data track of the media;
DDR is the output data rate of the disk drive;
VDR is the input video data rate required by an application;
MVST is the minimum video segment, measured in time units, which can be retrieved from the disk drive and still be provided to an application as part of a continuous video stream;

MVSB is the minimum video segment size, measured in bits of storage space, which can be retrieved from the disk drive and still be provided to an application as part of a continuous video stream;

MACC is the maximum access time of the disk drive to retrieve any video segment from the disk (i.e. the worst case access);

P is the period of revolution of the rotating media;

R is the radius of a given data track;

TS is the seek time between adjacent tracks;

SEEK is the maximum seek time between any two tracks on the disk (i.e. the worst case seek);

N is the number of data tracks required to store the MVST. In the case of constant frequency recording, the number of tracks required to store the video segment is a constant. However for zone recording less tracks are required to store the MVST at the outside diameter (OD) than at the inside diameter (ID) of the media;

$N_{min}$ is the minimum number of data tracks required to store the MVST.

$$BUF = Bin - Bout = MVSB - VDR(N_{min} \times P + (N_{min} - 1) \times TS) \quad (1)$$

$$DDR = \frac{2 \times \pi \times R \times \text{Linear Density}}{P} \quad (2)$$

$$MACC = SEEK + P = \frac{BUF}{VDR} \quad (3)$$

$$MVSB = MVST \times VDR \quad (4)$$

$$\text{Bits per track} = 2 \times \pi \times R \times \text{Linear Density} \quad (5)$$

$$\text{Number of Data Tracks} = N = \frac{\text{Video Segment Size}}{\text{Bits/track}} \quad (6)$$

From the above relationships the design parameters of the disk drive 106 (which include the rotational speed, seek time and data rate) are dependent upon the data rate requirements specific to video data, the size of the FIFO memory buffer 214 and system or application requirements for minimum video segment time. Given a minimum video segment size (the length, in seconds, of the smallest video segment which can be retrieved from the disk) and the proper selection of FIFO memory buffer size the disk drive data rate and access time can be minimized and therefore the recording density can be maximized.

Figure 3:
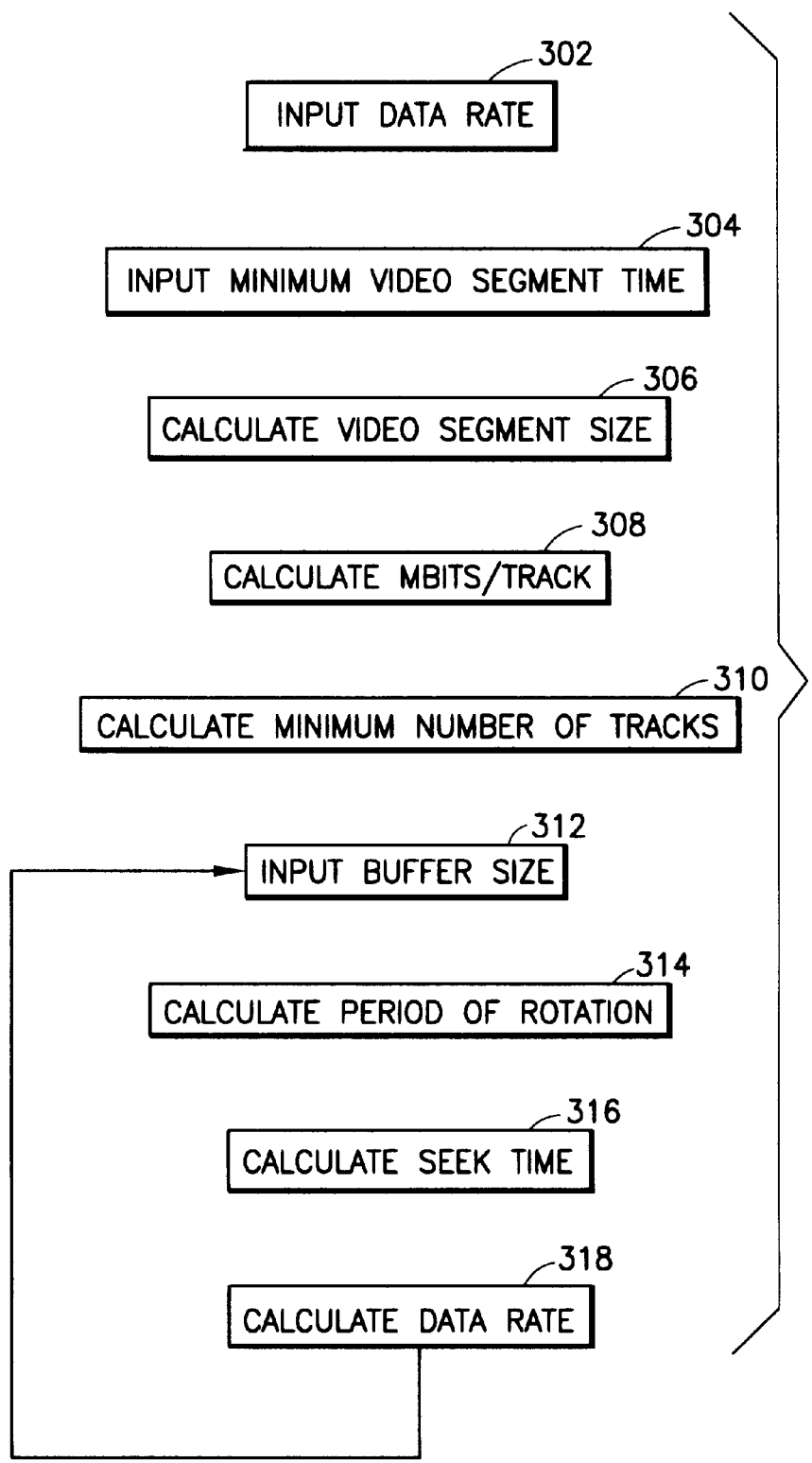
FIG. 3 shows a block diagram of a procedure for determining the performance parameters for each of the disk drive electronic function blocks.

The procedure to set the design parameters for each of the blocks of FIG. 2, is shown in FIG. 3.

In step 302 the video data rate (VDR) is set to the data rate required by the application for the data type which is to be stored. For example, where the application requires that the system read MPEG-1 compressed video data, the video data rate is set to 1.5 Megabits/sec.

In step 304 the minimum video segment play time (MVST) is determined by the application requirements. For example, a 2 second video clip may be the minimum video segment which can be retrieved from the disk in a given system.

In step 306, the video segment size is determined by equation 4.

In step 308 the number of data bits per recorded track is calculated from equation 5.

In step 310, number of tracks is calculated by equation 6 and set equal to the minimum number of tracks to store the video segment, which for zone recording occurs at the outside diameter of the disk drive.

In step 312, the size (BUF) of the fifo memory buffer is set to a nominal value.

In step 314, equation 1 is used to solve for the period of rotation for the nominal buffer size of step 312 and a preset value for TS.

In step 316, the nominal buffer size and period of rotation are substituted into equation 3, and the seek time (SEEK) is calculated.

In step 318, the disk drive data rate (DDR) is calculated from equation 2.

Step 312–318 are then repeated for various memory sizes to generate a table of operating parameters which can be selected. An example of such a table is shown in Table 1.

Once the operating parameters are selected, blocks 208–214 of FIG. 2 are programmed with the appropriate values of rotational speed, seek time, data rate and memory buffer size. It should be noted that alternative procedures to the one described above can be used, such as replacing step 312 with setting the period of rotation and step 314 with calculating the memory buffer size from the input period of rotation.

In the following table an example is given for a disk drive with is 3.5 inches and a zone recording system with linear recording density of 100 Kbpi.

TABLE 1

| VDR Mb/sec | MVST Mb | MVSB bits | BTM bits | NMIN | BUF Mb | SEEK msec | P msec | TS msec | DDR Mb/sec | RPM |
|---|---|---|---|---|---|---|---|---|---|---|
| 1.5 | 0.7 | 1.05 | 1.1 | 1 | 0.59 | 66.8 | 323.8 | 10 | 3.4 | 185 |
| 1.5 | 0.7 | 1.05 | 1.1 | 1 | 0.75 | 290.7 | 209.3 | 10 | 5.3 | 287 |
| 1.5 | 0.7 | 1.05 | 1.1 | 1 | 0.90 | 495.3 | 104.7 | 10 | 10.5 | 573 |
| 1.5 | 2 | 3 | 1.1 | 3 | 0.87 | 63.9 | 518.2 | 10 | 2.1 | 116 |
| 1.5 | 2 | 3 | 1.1 | 3 | 1.00 | 175.1 | 488.4 | 10 | 2.3 | 123 |
| 1.5 | 2 | 3 | 1.1 | 3 | 1.20 | 357.1 | 439.6 | 10 | 2.5 | 136 |
| 1.5 | 5 | 7.5 | 1.1 | 7 | 1.05 | 66.5 | 630.1 | 10 | 1.7 | 95 |
| 1.5 | 5 | 7.5 | 1.1 | 7 | 1.50 | 410.8 | 586.1 | 10 | 1.9 | 102 |
| 1.5 | 5 | 7.5 | 1.1 | 7 | 2.00 | 792.6 | 537.3 | 10 | 2.1 | 112 |

For example, a 873 Kilobit buffer which is filled once per revolution of the disk rotating at approximately 116 RPM would require a minimum disk drive data rate of approximately 2.1 megabits/sec. The seek time for random video segments would be 63.9 milliseconds and the single track seek time (between tracks) is not longer than 10 milliseconds. This example provides continuous video segments with a minimum duration of approximately 2.0 seconds corresponding to a minimum of three revolutions of the storage media with a diameter 3.5 inches and a linear density of 100 Kbpi.

As previously described, each request by the user for one or more video segments results in a wait time consisting of the seek and the latency, which for the above case is set equal to 389 milliseconds.

It should be noted that reduction in the data rate, reduces the electronics noise input to the detection channel. This reduction in noise enables an increase in the recorded density. Similarly the lengthening in the access time, which is a combination of seek time (time to move the actuator arm and settle onto the track) and the rotational speed of the media results in a reduction of the track misregistration in the recording device, which allows the track density of the device to be increased above that of Drive 1 104 of FIG. 1. The combination of both reduced data rate and longer access times results in increases in linear and track density and therefore the recording density. The operating parameters of the files designed explicitly for video data results in a device with optimized recording density and storage capacity while meeting system requirements.

The present method does not require relaxing the error rate requirements used by conventional disk drives designed to store random alphanumeric data (i.e. the acceptable error rate need not be increased from that of a conventional general purpose disk drive). Thus, in accordance with the forgoing principles a disk drive can be designed to have an access time, rotation speed, recording density and buffer size selected to maximize the storage capacity the magnetic recording media for video data while meeting the maximum error rate requirements for applications consuming random alpha-numeric data. For example, a disk drive such as shown in U.S. Pat. No. 4,780,866 (which is incorporated by reference herein as if printed in full below) can be modified in accordance with the principles of the present invention to accommodate both video applications and those requiring random alpha-numeric data.

Figure 4:
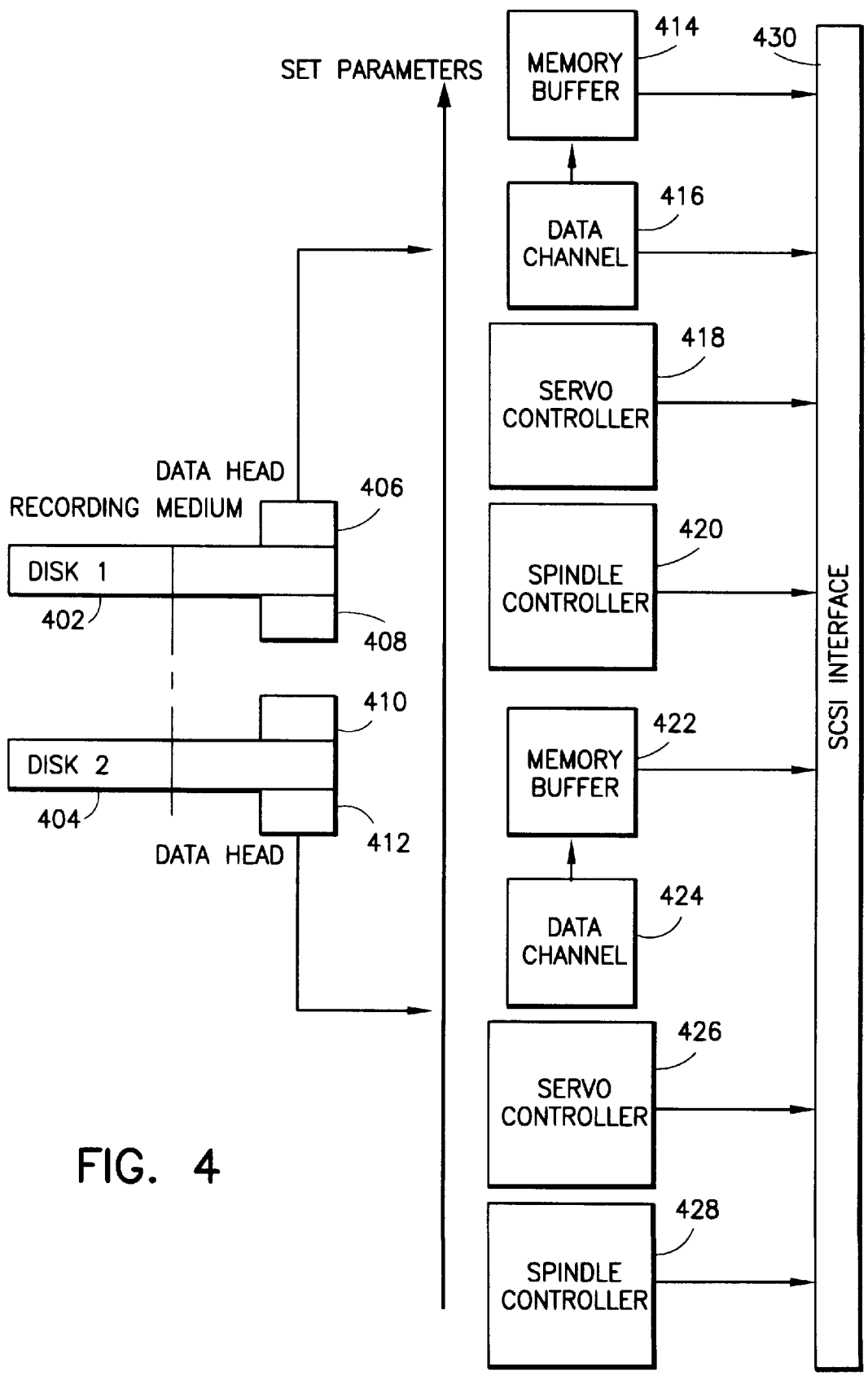
FIG. 4 shows a disk drive having a first rotating magnetic medium for storage of alphanumeric data a second region rotating magnetic medium for storage of other data types such as video.

A second embodiment of the invention whereby a rotating magnetic disk drive is designed with two separate recording media is shown in FIG. 4. One media or surface is optimized for alphanumeric data with appropriate settings for the Data Channel, Servo Controller and Spindle Speed Controller.

The second media 404 or surface, is designed as described for the second disk drive 106 of FIG. 1 and employs one or more second recording transducers 410, 412 which are appropriately set for a second multimedia data where the Data Channel 424, Servo Controller 426 and Spindle Speed Controller 428 are optimized for the type of data required. Switching between the two surfaces and changing the media rotation speed can allow the storage device to have multiple areas each optimized for the type of data stored.

The spacing between the recording transducers and the media is typically controlled by an air bearing slider. An appropriate slider, which produces a flyheight independent of velocity over a wide range of velocity (RPM), is described in U.S. patent application Ser. No. 08/082,210; filed Jun. 24, 1993 and assigned to the same assignee as the present invention; which is incorporated by reference herein as if printed in full below.

It should be understood that the multimedia disk drive described herein can be incorporated into systems other than general purpose computers. For example, the multimedia disk drive can be incorporated into a set-top box and used to receive downloaded movies received from a video server by way of a communications network.

Once determined, the above described parameters can be incorporated into the fixed design of the disk drive. As an alternative, the effected disk drive components can be programmable such that they are recomputed and modified for each application. In such an embodiment, the application could contain the parameters and they could be downloaded into the disk drive controller from the computer system. As another alternative, the computer or disk drive can be programmed to recognize the application requirements based on accumulated history and dynamically change its parameters accordingly so as to meet the application requirements and maximum data storage capacity.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

What is claimed is:

1. A method of designing a disk drive, comprising the steps of:
   (a) first, determining data rate requirements of a particular type of application that will consume a particular class of digital data, other than random alpha-numeric data, from the disk drive, said data rate requirements being less than the data rate requirements for random alpha-numeric data; and
   (b) after determining the data rate requirements, selecting access time, rotation speed, recording density and buffer size of the disk drive based on the lower data rate requirements so as to maximize storage capacity of the disk drive for the particular class of data while meeting the data rate requirements for the type of application and while meeting the maximum error rate requirements for applications consuming random alpha-numeric data;
   (c) providing a disk drive optimized for storage a maximum amount of usable data of the particular class and having the access time, rotation speed, recording density and buffer size selected in step (b).

2. The method of claim 1 wherein the type of application is full motion video and the class of data is video data.

3. The method of claim 1 wherein the type of application is full motion video and the class of data is audio-visual data.

4. The method of claim 1 wherein the class of data is audio data.

5. The method of claim 1 wherein the class of data is compressed video data and the data rate requirements are the decoder requirements.

6. A magnetic disk drive, comprising:
   a spindle carrying a magnetic recording media;
   a data head mounted on an actuator and disposed in proximity to a first surface of the magnetic recording media;
   a servo controller coupled to the actuator;
   a spindle controller coupled to the spindle, for controlling rotational speed of the spindle;
   a data channel coupled to the data head;
   a memory buffer coupled to the data channel;
   an input Output interface coupled to the memory buffer; and
   an additional data head disposed in proximity to a second surface of the magnetic recording media, the additional data head being coupled to a controller having parameters selected for the storage and recovery of random alphanumeric data to meet maximum error requirements of alphanumeric data while the access time, rotation speed, recording density and buffer size are selected to maximize the storage capacity of the first surface of the magnetic recording media for video data meeting the data rate requirements for video applications.

7. The computer system of claim 6 where the maximum access time, MACC, of the second surface is proportional to BUF/VDR where BUF is the size of the buffer and VDR is the data rate.

8. The computer system of claim 6 wherein the size of the buffer is at least sufficient to store all the data read from the disk drive during a video segment.

9. A method of operating a disk drive, comprising the steps of:
(a) determining data rate requirements of an application that will consume a particular class of data from the disk drive; and,
(b) dynamically modifying at least one of access time, rotation speed, recording density and buffer size of the disk drive so as to maximize storage capacity of the disk drive for the particular class of data while meeting the data rate requirements, wherein the dynamically modifying is performed responsive to an accumulated history of application requirements.

10. A computer system comprising:
a first and second rotating mass storage of the same media the first rotation mass storage having data rate, access time and recording density established for storage of random alphanumeric data; and
the second rotation mass storage for storing and retrieving video data having a slower data rate than in the first mass storage media and a higher recording density than in the first mass storage media based on the slower data rate to optimize the amount of video data which can be stored on the second mass storage media while meeting on-track error rate requirements in both the first and second mass storage of the same media.

11. The computer system of claim 10 wherein where said first and second rotating mass storage media is a magnetic storage media.

12. The computer system of claim 10 including a buffer.

13. The computer system of claim 12 where the maximum access time, MACC, of the second rotating mass storage is proportional to BUF/VDR where BUF is the size of the buffer and VDR is the data rate.

14. The computer system of claim 12 wherein the buffer size is at least sufficient to store all the data read from the disk drive during a video segment.

15. The computer system of claim 10 wherein said first and second rotating mass storage medias are different parts of the same disk drive.

16. The computer system of claim 10 wherein said first and second rotating mass media are on different disk drives.

17. The computer system of claim 10 wherein the first rotating mass storage media contains program instructions and the second rotating storage media contains only video data or audio-visual data.

18. In a computer system, a method of maximizing the storage density in disk storage devices comprising:
dividing mass storage space on a single type of disk storage media into first and second disk storage media spaces the first disk storage media space for storing random alphanumeric data and the second disk storage space for storing video or audio visual data;
establishing a data rate access time and recording density in the first storage media meeting maximum track error rate requirements for random alphanumeric data;
establishing a slower data rate access time in the second disk storage media space than established in the first disk storage media space the slower data rate access time being selected so that the video or audio visual data signals meet the error rate requirements for video or audio visual data using a greater storage density in the second disk storage media space than in the first disk storage media space to optimize the amount of video or audio-visual data that can be stored in the second mass storage media while meeting track error rate requirements.

19. The method of claim 18 including said selecting said slower data rate to provide data for a full motion video segment of an application as part of a continuous video stream.

20. The method of claim 19 including establishing a longer access time in the second disk storage media space than in the first data media space to provide a greater track density in the second disk storage media space than in the first disk storage media space.

21. In a computer system, a method of maximizing the storage density in disk storage devices comprising:
dividing mass storage on the same media into a first disk storage media space for storing random alphanumeric data and second disk storage media space for storing video or audio visual data;
establishing a data rate access time and recording density in the first storage media meeting maximum track error rate requirements for random alphanumeric data;
establishing a slower data rate access time in the second disk storage media space than established in the first disk storage media space, the slower data rate access time being selected so that the video or audio visual signals meet said maximum error rate requirements for alphanumeric data and using greater storage density in the second disk storage media space than in the first disk storage media space to optimize the amount of video or audio-visual data that can be stored in the second mass storage media.

22. The method of claim 21 wherein said selecting said slower data rate access time to provide data for a full motion video segment of an application as part of a continuous video stream.

23. The method of claim 22 including establishing a longer access time in the second disk storage media space than in the first data media space based upon providing full motion video for a minimum video segment size to provide a greater track density in the second disk storage media space than in the first disk storage media space.

24. The method of claim 21 wherein selection of access time, rotation speed, recording density and buffer size of the second disk storage media space includes the steps of:
(a) identifying a maximum data rate to be handled by a video application providing data for a continuous full motion video signal to be supplied with an encoded video stream from the disk drive;
(b) selecting a minimum video segment size for the second disk storage media space;
(c) determining a maximum allowable delay between reading video segments of the minimum video segment size;
(d) selecting an access time;
(e) selecting a buffer size capable of storing an amount of video data sufficient to provide the video stream for a time period at least equal to the maximum allowable delay given the access time; and
(f) selecting a rotation speed and recording density of the encoded video data which can be stored on the disk drive based on the maximum data rate to be handled so as to maximize the amount of data which can be recorded in the second disk storage media space and continuously supplied at the maximum rate to the application while meeting the maximum error rate requirements for applications consuming random alphanumeric data.

* * * * *